(12) United States Patent
Kato et al.

(10) Patent No.: US 10,711,100 B2
(45) Date of Patent: Jul. 14, 2020

(54) DIHYDROXY COMPOUND

(71) Applicant: MITSUBISHI GAS CHEMICAL COMPANY, INC., Tokyo (JP)

(72) Inventors: Noriyuki Kato, Tokyo (JP); Mitsuteru Kondo, Tokyo (JP); Munenori Shiratake, Tokyo (JP); Kentaro Ishihara, Tokyo (JP); Koji Hirose, Tokyo (JP); Shinya Ikeda, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 16/383,163

(22) Filed: Apr. 12, 2019

(65) Prior Publication Data

US 2019/0233585 A1 Aug. 1, 2019

Related U.S. Application Data

(62) Division of application No. 15/769,486, filed as application No. PCT/JP2016/082617 on Nov. 2, 2016.

(30) Foreign Application Priority Data

Nov. 4, 2015 (JP) .................................. 2015-216979

(51) Int. Cl.
*C08J 9/228* (2006.01)
*C08G 64/30* (2006.01)
(Continued)

(52) U.S. Cl.
CPC ........... *C08G 64/307* (2013.01); *C08G 63/64* (2013.01); *C08G 63/66* (2013.01); *C08G 63/668* (2013.01);
(Continued)

(58) Field of Classification Search
USPC ......................................................... 521/56
See application file for complete search history.

(56) References Cited

U.S. PATENT DOCUMENTS

| | | |
|---|---|---|
| 2010/0048855 A1 | 2/2010 | Kato et al. |
| 2012/0123083 A1 | 5/2012 | Nunome et al. |

(Continued)

FOREIGN PATENT DOCUMENTS

| | | |
|---|---|---|
| JP | 2011-084731 | 4/2011 |
| JP | 2015-168658 | 9/2015 |

(Continued)

OTHER PUBLICATIONS

International Search Report issued in International Bureau of WIPO Patent Application No. PCT/JP2016/082617, dated Dec. 6, 2016.
(Continued)

*Primary Examiner* — Terressa Boykin
(74) *Attorney, Agent, or Firm* — Greenblum & Bernstein, P.L.C.

(57) ABSTRACT

The present invention provides a method for producing a thermoplastic resin by reacting reactants comprising a dihydroxy compound. In this production method, the dihydroxy compound comprises a dihydroxy compound represented by the following formula (1), wherein the total weight of a compound represented by the following formula (A), a compound represented by the following formula (B), and a compound represented by the following formula (C) in the dihydroxy compound is 1,500 ppm or less, based on 100 parts by weight of the dihydroxy compound represented by the formula (1):

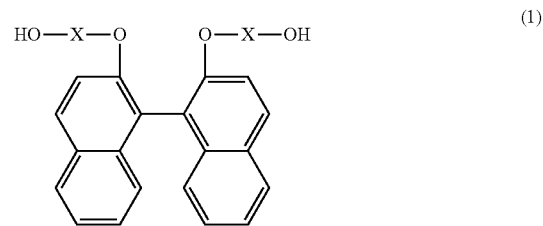

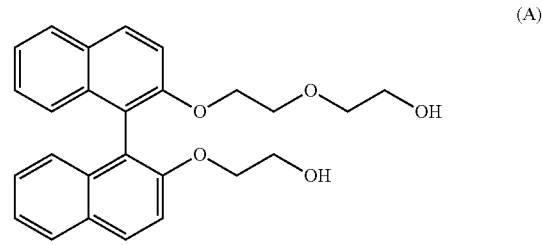

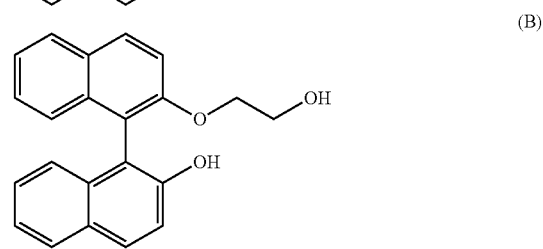

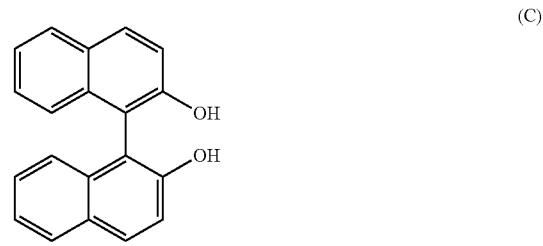

21 Claims, No Drawings

(51) Int. Cl.
*G02B 1/04* (2006.01)
*C08G 63/668* (2006.01)
*C08G 63/66* (2006.01)
*C08G 63/78* (2006.01)
*C08G 63/64* (2006.01)
*C08G 64/06* (2006.01)

(52) U.S. Cl.
CPC .............. *C08G 63/78* (2013.01); *C08G 64/06* (2013.01); *G02B 1/04* (2013.01); *G02B 1/041* (2013.01)

(56) References Cited

U.S. PATENT DOCUMENTS

2012/0172570 A1 7/2012 Tabata et al.
2015/0285954 A1 10/2015 Ishizuka et al.

FOREIGN PATENT DOCUMENTS

| JP | 2015-180747 | 10/2015 |
| WO | 2007/142149 | 12/2007 |
| WO | 2011/010741 | 1/2011 |
| WO | 2014/073496 | 5/2014 |

OTHER PUBLICATIONS

International Preliminary Report on Patentability in PCT/JP2016/082617 dated May 8, 2018 with English translation.

DIHYDROXY COMPOUND

CROSS-REFERENCE TO RELATED APPLICATIONS

The present application is a Divisional of U.S. application Ser. No. 15/769,486, filed Apr. 19, 2018, which is a National stage of International Patent Application No. PCT/JP2016/082617, filed Nov. 2, 2016, which claims priority to Japanese Application No. 2015-216979, filed Nov. 4, 2015. The disclosures of application Ser. No. 15/769,486 and International Patent Application No. PCT/JP2016/082617 are incorporated by reference herein in their entireties.

TECHNICAL FIELD

The present invention relates to a thermoplastic resin that is excellent in dimensional stability upon molding and hue.

BACKGROUND ART

In recent years, electronic devices such as digital cameras, smart phones and tablets have become popular, and a demand for compact camera modules has been increased. For these camera modules, plastic lenses are preferably used, rather than glass lenses. This is because a plastic lens can be used in various forms such as a thin lens or an aspherical lens, and the plastic lens is inexpensive and the mass production thereof is easily carried out by injection molding.

For optical lenses, resins having various structures, which are to be replaced for glass, have been developed, and various monomers have been studied as raw materials therefor. Among optical transparent resins, an optical lens consisting of a thermoplastic transparent resin is advantageous in that it can be produced in a large amount by injection molding, and further in that the production of an aspherical lens is easy, and thus, it is presently used as a lens for cameras. As such an optical transparent resin, for example, polycarbonate consisting of bisphenol A (BPA) had been mainly used, but thereafter, polymers having a fluorene skeleton such as 9,9-bis(4-(2-hydroxyethoxy)phenyl)fluorene (BPEF) (Patent Literatures 1 and 2) have been developed. Moreover, as a material having a high refractive index and low birefringence, a resin comprising, as a raw material monomer, a dihydroxy compound having a binaphthalene skeleton has been developed by the present inventors (Patent Literature 3).

Such a resin comprising, as a raw material monomer, a dihydroxy compound having a binaphthalene skeleton is preferable as an optical material, but the resin is problematic in that it has a high saturated water absorption rate and a dimensional change easily occurs upon molding. In addition, if such a saturated water absorption rate is high, a long drying time becomes necessary upon molding, and it may cause coloration. Accordingly, it has been desired to develop a resin that is useful as an optical material and has a low saturated water absorption rate.

CITATION LIST

Patent Literature

Patent Literature 1: International Publication WO2007/142149
Patent Literature 2: International Publication WO2011/010741
Patent Literature 3: International Publication WO2014/073496

SUMMARY OF INVENTION

Technical Problem

It is an object of the present invention to provide a method for producing a thermoplastic resin having a low saturated water absorption rate.

Solution to Problem

As a result of intensive studies directed towards achieving the aforementioned object, the present inventors have found that the aforementioned object can be achieved by setting the content of a specific dihydroxy compound in a dihydroxy compound having a specific binaphthalene skeleton to be within a predetermined range, thereby completing the present invention. Specifically, the present invention is, for example, as follows.

[1] A method for producing a thermoplastic resin by reacting reactants comprising a dihydroxy compound, wherein
the dihydroxy compound comprises a dihydroxy compound represented by the following formula (1), wherein
the total weight of a compound represented by the following formula (A), a compound represented by the following formula (B), and a compound represented by the following formula (C) in the dihydroxy compound is 1,500 ppm or less, based on 100 parts by weight of the dihydroxy compound represented by the formula (1):

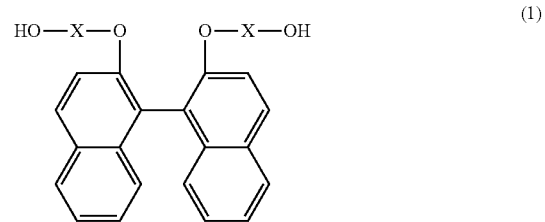

(1)

wherein X represents an alkylene group containing 1 to 4 carbon atoms,

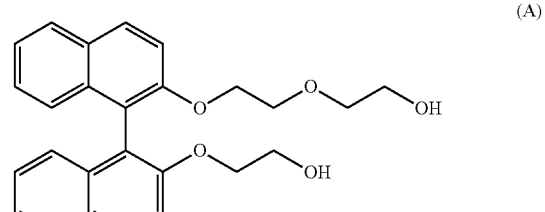

(A)

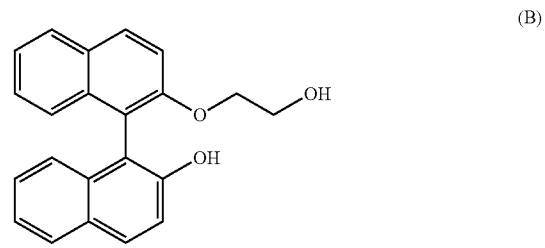

(B)

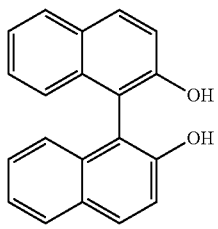

(C)

[2] The production method according to the above [1], wherein the dihydroxy compound further comprises a compound represented by the following formula (2):

(2)

wherein $R_1$ to $R_4$ are each independently selected from the group consisting of a hydrogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, an aryloxy group containing 6 to 20 carbon atoms, and a halogen atom;

X each independently represents an alkylene group containing 2 to 8 carbon atoms; and n each independently represents an integer of 1 to 5.

[3] The production method according to the above [1] or [2], wherein the weight average molecular weight of the thermoplastic resin is 35,000 to 70,000.

[4] The production method according to any one of the above [1] to [3], wherein the weight of the compound represented by the formula (A) in the dihydroxy compound is 300 ppm or less, based on 100 parts by weight of the dihydroxy compound represented by the formula (1).

[5] The production method according to any one of the above [1] to [4], wherein the weight of the compound represented by the formula (B) in the dihydroxy compound is 100 ppm or less, based on 100 parts by weight of the dihydroxy compound represented by the formula (1).

[6] The production method according to any one of the above [1] to [5], wherein the weight of the compound represented by the formula (C) in the dihydroxy compound is 100 ppm or less, based on 100 parts by weight of the dihydroxy compound represented by the formula (1).

[7] The production method according to any one of the above [1] to [6], wherein the purity of the dihydroxy compound represented by the formula (1) is 99% or more.

[8] The production method according to any one of the above [1] to [7], wherein the thermoplastic resin is selected from the group consisting of a polycarbonate resin, a polyester resin, and a polyester carbonate resin.

[9] The production method according to the above [8], wherein the thermoplastic resin is a polycarbonate resin.

[10] The production method according to any one of the above [1] to [9], wherein the reactants further comprise carbonic acid diester.

[11] The production method according to any one of the above [1] to [10], wherein the saturated water absorption rate of the thermoplastic resin is 0.39% by weight or less.

[12] A method for producing an optical element, which is characterized in that it uses a thermoplastic resin obtained by the production method according to any one of the above [1] to [11].

[13] A method for producing an optical lens, which is characterized in that it uses a thermoplastic resin obtained by the production method according to any one of the above [1] to [11].

[141] A method for producing an optical film, which is characterized in that it uses a thermoplastic resin obtained by the production method according to any one of the above [1] to [11].

Effects of Invention

According to the present invention, a thermoplastic resin having a low saturated water absorption rate, in which a dimensional change hardly occurs upon molding, can be obtained.

DESCRIPTION OF EMBODIMENTS

Hereinafter, the present invention will be described in detail in the following embodiments, illustrations and the like. However, the present invention is not limited to these embodiments, illustrations and the like, and the present invention can be carried out by being arbitrarily modified in a range in which such modification is not deviated from the gist of the present invention.

One embodiment of the present invention relates to a method for producing a thermoplastic resin by reacting reactants comprising a dihydroxy compound. In this production method, the dihydroxy compound comprises a dihydroxy compound represented by the following formula (1), wherein the total weight of a compound represented by the following formula (A), a compound represented by the following formula (B), and a compound represented by the following formula (C) in the dihydroxy compound is 1,500 ppm or less, based on 100 parts by weight of the dihydroxy compound represented by the formula (1):

(1)

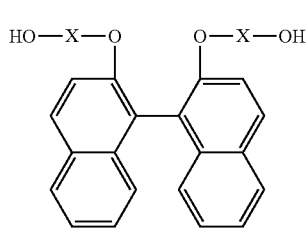

(A)

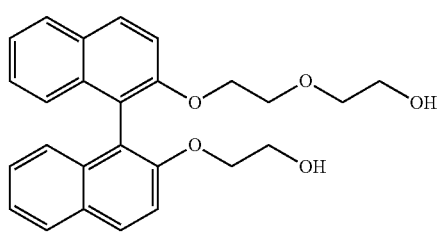

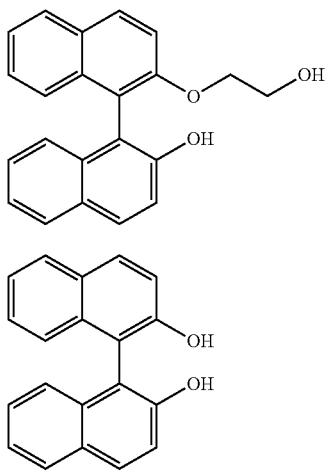

The dihydroxy compound represented by the formula (1) comprises a plurality of by-product compounds having a dinaphthol structure as impurities generated in the process of synthesis. The present inventors have found that, among such by-product compounds, the presence of the compound represented by the formula (A), the compound represented by the formula (B) and/or the compound represented by the formula (C) causes an increase in the saturated water absorption rate of a thermoplastic resin obtained by polymerizing the dihydroxy compound represented by the formula (1), and a reduction in the speed of the polymerization reaction. Moreover, the present inventors have found that the speed of the polymerization reaction can be improved and the saturated water absorption rate of the thermoplastic resin obtained by the polymerization can be reduced by using raw materials in which the aforementioned compounds are reduced.

One advantage provided by a low saturated water absorption rate is that a change in the dimension of a resin hardly takes place upon molding. Another advantage provided by a low saturated water absorption rate is that drying can be carried out in a short time during molding and the coloration of a resin can be thereby suppressed.

Moreover, according to the production method of the present invention, the speed of the polymerization reaction can also be improved. An advantage provided by the improvement of the polymerization reaction speed is that a high-molecular-weight thermoplastic resin can be obtained in a short time. Thermoplastic resins having various molecular weights are demanded depending on various needs for optical materials. In general, if polymerization is carried out for a long period of time in order to obtain a high-molecular-weight resin, the coloration of a resin easily takes place. Thus, it is difficult to obtain a high-molecular-weight thermoplastic resin with a little coloration. The production method of the present invention enables the production of a high-molecular-weight resin in a short time, and thus, it is advantageous for the production of a thermoplastic resin as an optical material.

The production method of the present invention is characterized in that the total weight of the compound represented by the formula (A), the compound represented by the formula (B), and the compound represented by the formula (C), which are comprised in the dihydroxy compound as a raw material for a thermoplastic resin, is 1.500 ppm or less, based on 100 parts by weight of the dihydroxy compound represented by the formula (1). If the above-described total weight is 1500 ppm or less, the effect of reducing the saturated water absorption rate of the thermoplastic resin, and/or improving the polymerization reaction speed, can be obtained. The total weight of the compound represented by the formula (A), the compound represented by the formula (B), and the compound represented by the formula (C) is preferably 1000 ppm or less, more preferably 500 ppm or less, and further preferably 300 ppm or less. The lower the lower limit value of the total weight of the compound represented by the formula (A), the compound represented by the formula (B) and the compound represented by the formula (C), the more preferable it is. The lower limit value is, for example, 0 ppm, and it may also be 1 ppm or more. The dihydroxy compound represented by the formula (1) generally comprises any of the compounds of the formulae (A), (B), and/or (C), which are generated as by-products in the synthetic process thereof. The technique of setting the total content of these compounds to be less than 1 ppm imposes a great burden on purification techniques. Moreover, when the total content that is less than 1 ppm is compared with the total content that is 1 ppm, there is no significant difference in physical properties between the two cases.

In a preferred embodiment, the total weight of the compound represented by the formula (A) and the compound represented by the formula (B) in the dihydroxy compound is 1000 ppm or less (more preferably, 500 ppm or less, and further preferably, 300 ppm or less), based on 100 parts by weight of the dihydroxy compound represented by the formula (1). Since the compound of the formula (A) and the compound of the formula (B) have an ethylene oxide chain and a phenolic hydroxyl group, these compounds have high polarity and tend to improve hydrophilicity. Accordingly, by reducing the content of the compound of the formula (A) and the compound of the formula (B), the saturated water absorption rate of the obtain thermoplastic resin can be further reduced.

From the viewpoint of a reduction in the saturated water absorption rate of the thermoplastic resin and the improvement of the polymerization speed, the weight of the compound represented by the formula (A) in the dihydroxy compound is preferably 300 ppm or less, and more preferably 250 ppm or less, based on 100 parts by weight of the dihydroxy compound represented by the formula (1). The lower limit is not particularly limited, and it is for example, 0 ppm, or 1 ppm or more.

From the viewpoint of a reduction in the saturated water absorption rate of the thermoplastic resin and the improvement of the polymerization speed, the weight of the compound represented by the formula (B) in the dihydroxy compound is preferably 500 ppm or less, more preferably 300 ppm or less, further preferably 100 ppm or less, particularly preferably 50 ppm or less, and most preferably 25 ppm or less, based on 100 parts by weight of the dihydroxy compound represented by the formula (1). The lower limit is not particularly limited, and it is for example, 0 ppm.

From the viewpoint of a reduction in the saturated water absorption rate of the thermoplastic resin and the improvement of the polymerization speed, the weight of the compound represented by the formula (C) in the dihydroxy compound is preferably 100 ppm or less, and more preferably 50 ppm or less, based on 100 parts by weight of the dihydroxy compound represented by the formula (1). The lower limit is not particularly limited, and it is for example, 0 ppm.

The amounts of the compound represented by the formula (A), the compound represented by the formula (B) and the compound represented by the formula (C) comprised in the dihydroxy compound can be measured by using high performance liquid chromatography (HPLC). Measurement conditions for HPLC are, for example, are as follows.
(HPLC Measurement Conditions)
  LC measurement device: LC-2010A, manufactured by Shimadzu Corporation
  Column: YMC-Pack ODS-AM (4.6 mm in diameter×250 mm, particle diameter: 5 µm)
  Column temperature: 25° C.
  Mobile phase solvent: Pure water/acetonitrile (acetonitrile 20%→95%)
  Flow rate: 1.0 mL/min
  Detection method: UV (detection wavelength: 254 nm)
  Sensitivity: 2.5 AU/V (AUXRNG6)
  Sample: 50 mg/50 mL-acetonitrile In the embodiment of the present invention, the purity of the dihydroxy compound represented by the formula (1) is 99% or more. In such a case, the compound represented by the formula (A), the compound represented by the formula (B) and the compound represented by the formula (C) in the dihydroxy compound are reduced, and from the viewpoint of a reduction in the saturated water absorption rate of the thermoplastic resin and the improvement of the polymerization speed, it is preferable.

The method of reducing the compound represented by the formula (A), the compound represented by the formula (B) and the compound represented by the formula (C) in the dihydroxy compound is not particularly limited. Examples of the method include a method of purifying the dihydroxy compound represented by the formula (1) after the synthesis thereof (e.g., washing, filtration, etc.), and a method of changing conditions for synthesizing the dihydroxy compound represented by the formula (1) (e.g., the reaction temperature and the reaction time), the species of the reaction solvent, the amount of the solvent, etc.

The method for producing a thermoplastic resin according to one embodiment comprises a step of purifying the dihydroxy compound represented by the formula (1). The purification method is not particularly limited, and examples of the purification method include a filtration treatment and/or a washing treatment using a washing solvent. The filtration treatment method is not particularly limited. The mesh size of a filter is preferably 7 µm or less, and more preferably 5 µm or less. The washing solvent is not particularly limited, and examples of the washing solvent include: aromatic hydrocarbon-based solvents such as benzene, ethylbenzene, xylene, or ethyltoluene; aliphatic hydrocarbons such as pentane, hexane, or heptane; and water. Among these solvents, xylene and toluene are preferable. According to this method, the content of at least one of the compound represented by the formula (A), the compound represented by the formula (B), and the compound represented by the formula (C), which are comprised in the dihydroxy compound, can be significantly reduced.

The method for producing a thermoplastic resin according to one embodiment further comprises a step of allowing 1,1'-bi-2-naphthol to react with alkylene carbonate to obtain the dihydroxy compound of the formula (1), wherein the reaction is carried out at a temperature of 110° C. or higher (preferably, 110° C. to 120° C., and more preferably 110° C. to 115° C.). According to this method, the content of at least one of the compound represented by the formula (A), the compound represented by the formula (B), and the compound represented by the formula (C), which are comprised in the dihydroxy compound, can be significantly reduced.

The reaction time is preferably 11 hours or shorter, more preferably 9 to 11 hours, and further preferably 9 to 10 hours. The preferred reaction time can be fluctuated depending on the reaction scale. Besides, the reaction time means a time period required until an alkali aqueous solution is added to a reactor, from a time point where the temperature has reached a desired reaction temperature (e.g., 110° C.).

Hereafter, a thermoplastic resin obtained by the production method of the present invention will be described.
<Thermoplastic Resin>

A thermoplastic resin obtained by the production method according to the embodiment of the present invention is produced by reacting reactants comprising the dihydroxy compound represented by the formula (1). This thermoplastic resin comprises a constituting unit (1)' derived from the dihydroxy compound represented by the formula (1).

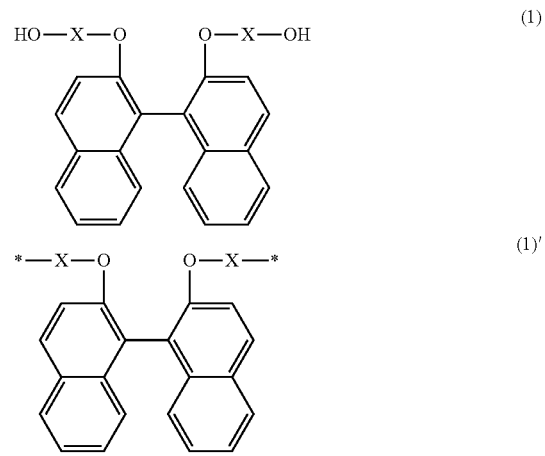

In the above formula (1)', the symbol * represents a binding moiety.

A resin comprising the compound of the above formula (1) as a raw material exhibits physical properties such as a high refractive index, a low Abbe number, high transparency, a glass transition temperature suitable for injection molding, and low birefringence. By using this resin, optical components, such as excellent optical lens having substantially no optical distortion can be obtained.

As a thermoplastic resin used herein, a polyester resin, a polyester carbonate resin, or a polycarbonate resin is preferable. Among others, the thermoplastic resin preferably comprises a polycarbonate resin, since the polycarbonate resin is excellent in heat resistance and hydrolysis resistance. The thermoplastic resin may comprise the aforementioned resins, alone or in combination of two or more types.

Optical properties such as refractive index, Abbe number, and birefringence value are greatly influenced by the chemical structure of a constituting unit. On the other hand, whether the chemical bond between constituting units is an ester bond or a carbonate bond has a relatively small influence on such optical properties. Moreover, also regarding the influence of impurities (an increase in the saturated water absorption rate or a decrease in the polymerization speed), the influence of the chemical structure of a constituting unit that constitutes a resin is large, and the influence of a difference in the chemical bond (an ester bond or a carbonate bond) between constituting units is relatively small.

The thermoplastic resin according to the embodiment of the present invention is produced by reacting reactants comprising a dihydroxy compound. For example, the present thermoplastic resin is produced by performing polycondensation using, as a raw material, a dihydroxy compound comprising the dihydroxy compound represented by the formula (1). In the compound represented by the formula (1), the functional group contributing to polycondensation is an alcoholic hydroxyl group. By reacting the compound represented by the formula (1) with a carbonic acid diester and/or a dicarboxylic acid or a derivative thereof according to a polycondensation reaction, a constituting unit (1)' derived from the compound represented by the formula (1) is allowed to bind to a carbonic acid diester and/or a dicarboxylic acid or a derivative thereof via a carbonate bond and/or an ester bond. By using the dihydroxy compound represented by the formula (1) as a raw material, a thermoplastic resin comprising the constituting unit (1)' derived from the dihydroxy compound represented by the formula (1) can be obtained.

In the formula (1), X each independently represents an alkylene group containing 1 to 4 carbon atoms. Preferred examples of such an alkylene group containing 1 to 4 carbon atoms include a methylene group, an ethylene group, a propylene group, an isopropylene group, an n-butylene group, an isobutylene group, a sec-butylene group, and a tert-butylene group. Among these groups, X is preferably always an ethylene group because the melt fluidity of a resin becomes favorable upon molding.

Examples of the dihydroxy compound represented by the formula (1) include 2,2'-bis(1-hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene, and 2,2'-bis(4-hydroxybutoxy)-1,1'-binaphthalene. Among these compounds, 2,2'-bis(2-hydroxyethoxy)-1,1'-binaphthalene is preferable. These compounds may be used alone, or may also be used in combination of two or more types.

The percentage of the dihydroxy compound of the formula (1) is preferably 1 to 100 mol %, more preferably 30 to 100 mol %, and further preferably 40 to 100 mol %, based on 100 mol % of the dihydroxy compound used as a raw material for a thermoplastic resin. Moreover, the percentage of the dihydroxy compound of the formula (1) is preferably 1 to 100 mol %, more preferably 30 to 100 mol %, and further preferably 40 to 100 mol %, based on 100 mol % of all monomers used as raw materials for a thermoplastic resin.

As mentioned above, the above-described dihydroxy compound may comprise at least one of the compound represented by the formula (A), the compound represented by the formula (B), and the compound represented by the formula (C). In general, when the dihydroxy compound comprises these compounds, these compounds, together with the dihydroxy compound of the formula (1), are subjected to a polycondensation reaction, so that a constituting unit (A)' derived from the compound represented by the formula (A), a constituting unit (B)' derived from the compound represented by the formula (B), and/or a constituting unit (C)' derived from the compound represented by the formula (C) can be incorporated into the thermoplastic resin.

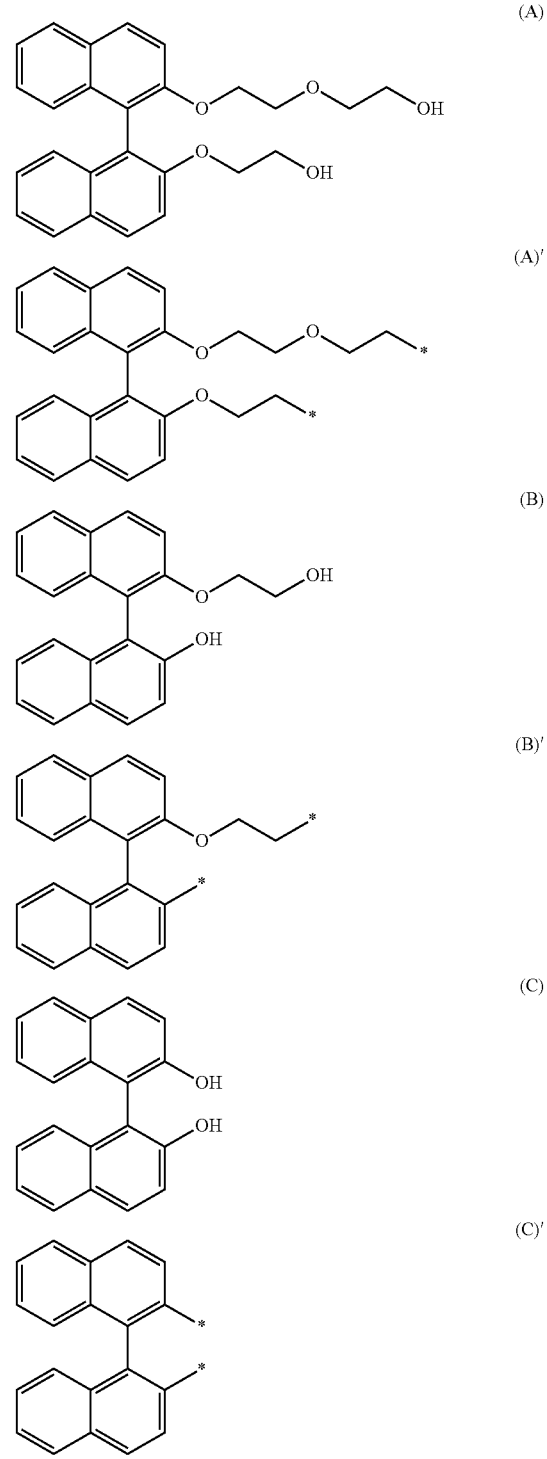

In the above formula (A)', (B)', or (C)', the symbol * represents a binding moiety.

(Other Dihydroxy Components)

In the present invention, as dihydroxy components, other dihydroxy compounds can be used in combination with the compound represented by the formula (1). For example, the dihydroxy compound further comprises the dihydroxy compound represented by the formula (2), as well as the dihydroxy compound represented by the formula (1). Using such a dihydroxy compound as a raw material, the obtained thermoplastic resin further comprises a constituting unit (2)' derived from the dihydroxy compound represented by the formula (2), as well as the constituting unit (1)' derived from the dihydroxy compound represented by the formula (1).

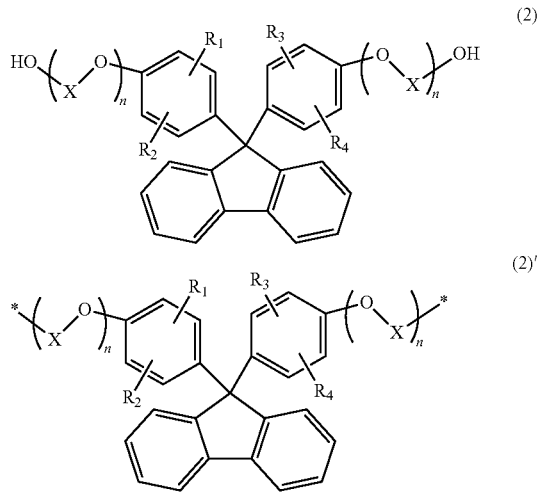

In the above formula (2)', the symbol * represents a binding moiety.

In the compound represented by the formula (2), the functional group contributing to polycondensation is an alcoholic hydroxyl group or a phenolic hydroxyl group. By using the dihydroxy compound of the formula (2) as a raw material, the obtained thermoplastic resin has the constituting unit (2)' derived from the compound represented by the formula (2). The constituting unit (2)' derived from the compound represented by the formula (2) contributes to a high refractive index. By allowing the thermoplastic resin to comprise the constituting unit (1)' and the constituting unit (2)', the effect of reducing the birefringence value of the entire resin and reducing the optical distortion of an optical molded body can be obtained.

In the formula (2), $R_1$ to $R_4$ each independently represent a hydrogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, an aryloxy group containing 6 to 20 carbon atoms, or a halogen atom (F, Cl, Br, or I). Among others, a compound in which $R^1$ to $R^4$ are hydrogen atoms is preferable, since the melt fluidity becomes favorable when it is molded into an optical lens. In addition, a compound, in which $R^1$ and $R^2$ are hydrogen atoms and $R^3$ and $R^4$ are aryl groups each containing 6 to 20 carbon atoms (preferably, phenyl groups), is preferable, since the optical properties of the thermoplastic resin become favorable.

In the formula (2), X each independently represents an alkylene group containing 2 to 8 carbon atoms. As the number of carbon atoms contained in X increases, melt viscosity decreases, and toughness and moldability are improved. Accordingly, a compound having an alkylene group containing 2 or more carbon atoms is preferable. On the other hand, as the number of carbon atoms contained in X increases, the glass transition temperature decreases. Accordingly, from the viewpoint of heat resistance, an alkylene group containing 3 or less carbon atoms is preferable. From the viewpoint of achieving both excellent molding easiness and heat resistance, the number of carbon atoms contained is more preferably 2 or 3, and in particular, from the viewpoint of being excellent in the refractive index and the production and distribution of monomers, X is preferably an ethylene group containing 2 carbon atoms.

In the formula (2), n each independently represents an integer of 1 to 5. Among others, in terms of excellent heat stability and easy availability, n is preferably 1.

Examples of the compound represented by the formula (2) include 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3,5-dimethylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, and 9,9-bis(4-(2-hydroxyethoxy)-3-phenylphenyl)fluorene. Among these compounds, 9,9-bis(4-(2-hydroxyethoxy)-3-phenylphenyl)fluorene and 9,9-bis(4-(2-hydroxyethoxy)phenyl)fluorene are preferable, and 9,9-bis(4-(2-hydroxyethoxy)phenyl)fluorene is more preferable. These compounds may be used alone, or may also be used in combination of two or more types.

The total amount of the dihydroxy compound of the formula (1) and the dihydroxy compound of the formula (2) is preferably 50 mol % or more, more preferably 80 mol % or more, particularly preferably 90 mol % or more, and most preferably 100 mol %, based on 100 mol % of the dihydroxy compound used as a raw material for a thermoplastic resin. The molar ratio between the dihydroxy compound of the formula (1) and the dihydroxy compound of the formula (2) (the constituting unit (1)' and the constituting unit (2)') is preferably 20/80 to 80/20, more preferably 30/70 to 80/20, and from the viewpoint of a reduction in the saturated water absorption rate, the aforementioned molar ratio is further preferably 30/70 to 50/50, and particularly preferably 40/60 to 50/50.

The dihydroxy compound may comprise constituting units derived from dihydroxy compounds other than the above-described compounds of the formulae (1) and (2). Examples of such other dihydroxy compounds include: alicyclic dihydroxy compounds such as tricyclodecane [5.2.1.0$^{2,6}$]dimethanol, pentacyclopentadecane dimethanol, cyclohexane-1,2-dimethanol, cyclohexane-1,4-dimethanol, cyclohexane-1,3-dimethanol, decaline-2,6-dimethanol, decaline-2,3-dimethanol, decaline-1,5-dimethanol, 2,3-norbornane dimethanol, 2,5-norbornane dimethanol, or 1,3-adamantane dimethanol; aliphatic dihydroxy compounds such as ethylene glycol, 1,3-propanediol, 1,2-propanediol, 1,4-butanediol, 1,3-butanediol, 1,2-butanediol, 1,5-pentanediol, 1,6-hexanediol, 1,5-heptanediol, 1,8-octanediol, 1,9-nonanediol, 1,10-decanediol, or spiroglycol; and aromatic dihydroxy compounds such as 4,4-bis(4-hydroxyphenyl)propane (i.e., bisphenol A), 1,1-bis(4-hydroxyphenyl)-1-phenylethane (i.e., bisphenol AP), 2,2-bis(4-hydroxyphenyl)hexafluoropropane (i.e., bisphenol AF), 2,2-bis(4-hydroxyphenyl)butane (i.e., bisphenol B), bis(4-hydroxyphenyl)diphenylmethane (i.e., bisphenol BP), bis(4-hydroxy-3-methylphenyl)propane (i.e., bisphenol C), 2,2-bis(4-hydroxy-3,5-dimethylphenyl)propane, 2,2-bis(4-hydroxy-3,5-diethylphenyl)propane, 2,2-bis(4-hydroxy-(3,5-diphenyl)phenyl)propane, 2,2-bis(4-hydroxy-3,5-dibromophenyl)propane, 1,1-bis(4-hydroxyphenyl)ethane (i.e., bisphenol E), bis(4-hydroxyphenyl)methane (i.e., bisphenol F), 2,4'-dihydroxy-diphenylmethane, bis(2-hydroxyphenyl)methane, 2,2-bis(4-hydroxy-3-isopropylphenyl)propane (i.e., bisphenol G), 1,3-bis(2-(4-hydroxyphenyl)-2- propyl)benzene (i.e., bisphenol M), bis(4-hydroxyphenyl) sulfone (i.e., bisphenol S), 2,4'-dihydroxydiphenylsulfone, bis(4-hydroxyphenyl)sulfide, 1,4-bis(2-(4-hydroxyphenyl)-2-propyl)benzene (i.e., bisphenol P), bis(4-hydroxy-3-phenylphenyl]propane (i.e., bisphenol PH), 1,1-bis(4-hydroxyphenyl)-3,3,5-trimethylcyclohexane (i.e., bisphenol TMC), 1,1-bis(4-hydroxyphenyl)cyclohexane (i.e., bisphenol Z), 1,1-bis(4-hydroxy-3-methylphenyl)cyclohexane (i.e., bisphenol OCZ), 3,3-bis(4-hydroxyphenyl)pentane, 4,4-biphenol, 9,9-bis(4-(2-hydroxyethoxy)phenyl)fluorene, 9,9-bis(4-hydroxy-2-methylphenyl)fluorene, 9,9-bis(4-hydroxyphenyl)fluorene, 9,9-bis(4-(2-hydroxyethoxy)-3-methylphenyl)fluorene, 9,9-bis(4-(2-hydroxyethoxy)-3-tert-butylphenyl)fluorene, 9,9-bis(4-(2-hydroxyethoxy)-3-isopropylphenyl)fluorene, 9,9-bis(4-(2-hydroxyethoxy)-3-cyclohexylphenyl)fluorene, 9,9-bis(4-(2-hydroxyethoxy)-3-phenylphenyl)fluorene, 2.2-bis(4-hydroxyphenyl)pentane, 4,4'-dihydroxydiphenyl ether, or 4,4'-dihydroxy-3,3'-dichlorodiphenyl ether.

Other dihydroxy compounds are added in an amount of desirably 20 mol % or less, and more desirably 10 mol % or less, based on 100 mol % of the compound of the formula (1). If the amount of other hydroxyl compounds is in this range, a high refractive index can be retained.

In order to maintain optical distortion at a low level, the thermoplastic resin is preferably a resin consisting of the constituting unit (1)' derived from the dihydroxy compound of the formula (1) (first aspect), or a resin consisting of the constituting unit (1)' derived from the dihydroxy compound of the formula (1) and the constituting unit (2)' derived from the dihydroxy compound of the formula (2) (second aspect). The thermoplastic resins of the first aspect and the second aspect (polycarbonate resin, polyester resin, and polyester carbonate resin) may be used by being mixed with one another, or can also be used by being mixed with other resins. The phrase "a resin consisting of the constituting unit (1)' and/or the constituting unit (2)'" means that the repeating units in the resin, other than a carbonate bond moiety and an ester bond moiety, consist of the constituting unit (1)' and the constituting unit (2)'. Besides, the polycarbonate bond moiety is derived from a carbonate precursor substance such as phosgene or carbonic acid diester.

The weight average molecular weight of the thermoplastic resin is preferably 10,000 to 100,000. The weight average molecular weight (Mw) of the thermoplastic resin means a weight average molecular weight in terms of styrene, and it is measured by the method described in the after-mentioned Examples. If Mw is 10,000 or more, the brittleness reduction of the molded body is prevented. If Mw is 100,000 or less, melt viscosity does not become too high, and thus, it is easy to remove the resin from a metallic mold upon molding. Moreover, good fluidity is achieved, and it is preferable for the injection molding of optical lenses and the like in a melted state, which is required to have precision. From the viewpoint of preventing the coloration of the resin and maintaining the strength of a molded body, the weight average molecular weight (Mw) is more preferably 35,000 to 70,000, and further preferably 40,000 to 65,000.

When the thermoplastic resin is used in injection molding, the glass transition temperature (Tg) is preferably 95° C. to 180° C., more preferably 110° C. to 170° C., further preferably 115° C. to 160° C., particularly preferably 125° C. to 145° C. If Tg is lower than 95° C., the range of the used temperature is unfavorably narrowed. On the other hand, if Tg exceeds 180° C. the melting temperature of the resin becomes high, and the decomposition or coloration of the resin is unfavorably easily generated. Moreover, when the glass transition temperature of the resin is too high, a different between the metallic mold temperature and the glass transition temperature of the resin becomes large, if a commonly used metallic mold temperature controller is used. Hence, in the intended use for which products are required to have high profile irregularity, it is difficult and thus unfavorable to use a resin having an extremely high glass transition temperature.

As an indicator of heat stability for enduring heating upon the injection molding of the thermoplastic resin, the 5% weight loss temperature (Td), which is measured at a temperature-increasing rate of 10° C./min, is preferably 350° C. or higher. When the 5% weight loss temperature is lower than 350° C., thermal decomposition significantly takes place upon molding, and thus, it unfavorably becomes difficult to obtain a good molded body.

The thermoplastic resin may have any structure of random, block, and alternating copolymers.

In the thermoplastic resin, phenol generated upon the production thereof or unreacted remaining carbonic acid diester is present as an impurity. The content of such phenol in the thermoplastic resin is preferably 0.1 to 3000 ppm, more preferably 0.1 to 2000 ppm, and particularly preferably 1 to 1000 ppm, 1 to 800 ppm, 1 to 500 ppm, or 1 to 300 ppm. In addition, the content of such carbonic acid diester in a polycarbonate resin or a polyester carbonate resin is preferably 0.1 to 1000 ppm, more preferably 0.1 to 500 ppm, and particularly preferably 1 to 100 ppm. By controlling the amounts of phenol and carbonic acid diester contained in the resin, a resin having physical properties depending on purpose can be obtained. The contents of phenol and carbonic acid diester can be controlled, as appropriate, by changing conditions or devices for polycondensation. Moreover, such contents can also be controlled by changing conditions applied in an extrusion step following polycondensation.

If the content of phenol or carbonic acid diester is higher than the above-described range, problems may occur, such as a reduction in the strength of the obtained resin molded body or generation of odor. In contrast, if the content of phenol or carbonic acid diester is lower than the above-described range, it may be likely that plasticity is reduced upon the melting of the resin.

The thermoplastic resin according to the embodiment desirably comprises foreign matters in extremely small amounts, and thus, it is preferable to carry out filtration of melted raw materials, filtration of a catalyst solution, and filtration of melted oligomers. The mesh size of a filter is preferably 7 µm or less, and more preferably 5 µm or less. Moreover, it is also preferable to filtrate the generated resin through a polymer filter. The mesh size of a polymer filter is preferably 100 µm or less, and more preferably 30 µm or less. Furthermore, a step of collecting resin pellets must be naturally carried out under a low-dust environment, and the class is preferably 6 or less, and more preferably 5 or less.

To the thermoplastic resin of the present invention, an antioxidant, a release agent, an ultraviolet absorber, a fluidity modifier, a crystal nucleating agent, a reinforcer, a dye, an antistatic agent, an antibacterial agent, and the like may be added.

Hereafter, a polycarbonate resin will be exemplified and explained as one example of thermoplastic resins. A polyester resin and a polyester carbonate resin can also be carried out with reference to the description of the following (Polycarbonate resin), and/or by applying a publicly known method.

(Polycarbonate Resin)

The polycarbonate resin according to the embodiment is a polycarbonate resin comprising the constituting unit (1)' derived from the compound represented by the above formula (1), and as necessary, the aforementioned other constituting units. The polycarbonate resin is generated by allowing a dihydroxy compound to react with a carbonate precursor substance such as carbonic acid diester, and individual constituting units bind to one another via a carbonate bond. In one embodiment, reactants further comprise carbonic acid diester, as well as a dihydroxy compound.

Specifically, the polycarbonate resin according to the embodiment can be produced by allowing a dihydroxy compound comprising the compound represented by the above formula (1) to react with a carbonate precursor substance such as carbonic acid diester according to a melt polycondensation method, in the presence of a transesterification catalyst or in the absence of a catalyst.

Examples of the carbonic acid diester include diphenyl carbonate, ditolyl carbonate, bis(chlorophenyl) carbonate, m-cresyl carbonate, dimethyl carbonate, diethyl carbonate, dibutyl carbonate, and dicyclohexyl carbonate. Among these compounds, diphenyl carbonate is particularly preferable. The diphenyl carbonate is used at a ratio of preferably 0.97 to 1.20 moles, and more preferably 0.98 to 1.10 moles, based on total 1 mole of the dihydroxy compound.

An example of the production method is a method comprising stirring dihydroxy compound components and carbonic acid diester to melt them under an inert gas atmosphere, while heating, and then polymerizing them, while distilling away the generated alcohols or phenols. The reaction temperature is different depending on the boiling point of the generated alcohols or phenols, etc., but it is generally in the range from 120° C. to 350° C. From the initial stage of the reaction, the pressure is reduced, and the reaction is then terminated while distilling away the generated alcohols or phenols. Moreover, in order to promote the reaction, a transesterification catalyst can also be used.

With regard to melt polycondensation in the present composition system, a dihydroxy compound comprising the compound represented by the formula (1) and carbonic acid diester are melted in a reactor, and thereafter, while monohydroxy compounds generated as by-products are distilled away, the reaction is carried out. The reaction time is 200 minutes or longer and 500 minutes or shorter, preferably 250 minutes or longer and 450 minutes or shorter, and particularly preferably 300 minutes or longer and 40 minutes or shorter. The preferred reaction time can be fluctuated depending on the reaction scale. Besides, the reaction time means a time period required until nitrogen is introduced into the reactor, from a time point where raw materials have been dissolved (i.e., a time point where stirring has become possible) (for example, after the temperature has reached 180° C.)).

The reaction may be carried out in a continuous system or in a batch system. The reactor used upon performing the reaction may be a vertical reactor equipped with an anchor impeller, a MAXBLEND impeller, a helical ribbon impeller, etc., or a horizontal reactor equipped with a paddle blade, a lattice blade, a spectacle blade etc., or an extruder-type reactor equipped with a screw. Furthermore, taking into consideration the viscosity of a polymer, a reactor, in which the aforementioned reactors are appropriately combined with one another, can preferably be used.

As such a transesterification catalyst, a basic compound catalyst is used. Examples of such a basic compound catalyst include an alkaline metal compound, an alkaline-earth metal compound, and a nitrogen-containing compound.

Examples of the alkaline metal compound include the organic acid salt, inorganic acid salt, oxide, hydroxide, hydride, or alkoxide of alkaline metals. Specific examples of the alkaline metal compound used herein include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium benzoate, potassium benzoate, cesium benzoate, lithium benzoate, disodium hydrogen phosphate, dipotassium hydrogen phosphate, dilithium hydrogen phosphate, disodium phenyl phosphate, the disodium salt, dipotassium salt, dicesium salt or dilithium salt of bisphenol A, and the sodium salt, potassium salt, cesium salt or lithium salt of phenol.

Examples of the alkaline-earth metal compound include the organic acid salt, inorganic acid salt, oxide, hydroxide, hydride, or alkoxide of an alkaline-earth metal compound. Specific examples of the alkaline-earth metal compound used herein include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, and magnesium phenyl phosphate.

Examples of the nitrogen-containing compound include quaternary ammonium hydroxide and a salt thereof, and amines. Specific examples of the nitrogen-containing compound used herein include: quaternary ammonium hydroxides having an alkyl group, an aryl group, etc., such as tetramethylammonium hydroxide, tetraethylammonium hydroxide, tetrapropylammonium hydroxide, tetrabutylammonium hydroxide, or trimethylbenzylammonium hydroxide; tertiary amines, such as triethylamine, dimethylbenzylamine, or triphenylamine; secondary amines, such as diethylamine or dibutylamine; primary amines, such as propylamine or butylamine; imidazoles, such as 2-methylimidazole, 2-phenylimidazole, or benzimidazole; and bases or basic salts, such as ammonia, tetramethylammonium borohydride, tetrabutylammonium borohydride, tetrabutylammonium tetraphenylborate, or tetraphenylammonium tetraphenylborate.

As other transesterification catalysts, the salts of zinc, tin, zirconium, lead, etc. may also be used. These salts can be used alone or in combination. Specific examples of other transesterification catalysts include zinc acetate, zinc benzoate, zinc 2-ethylhexanoate, tin(II) chloride, tin(IV) chloride, tin(II) acetate, tin(IV) acetate, dibutyltin laurate, dibutyltin oxide, dibutyltin dimethoxide, zirconium acetylacetonate, zirconium oxyacetate, zirconium tetrabutoxide, lead(II) acetate, and lead(IV) acetate.

The transesterification catalyst is used at a ratio of $1 \times 10^{-9}$ to $\times 10^{-3}$ moles, and preferably $1 \times 10^{-7}$ to $1 \times 10^{-4}$ moles, based on total 1 mole of the dihydroxy compound.

The catalysts may be used in combination of two or more types. In addition, the catalyst itself may be directly added to the reactants, or may be dissolved in a solvent such as water or phenol and may be then added to the reactants.

In the melt polycondensation method, melt polycondensation is carried out using the above-described raw materials and catalysts, under heating, and further, under an ordinary or reduced pressure, while by-products are removed by a transesterification reaction. The catalyst may be added together with raw materials at the initial stage of the reaction, or may be added in the course of the reaction.

In the method for producing a thermoplastic resin of the present invention, in order to retain heat stability and hydrolytic stability, the catalyst may be removed or deactivated after completion of the polymerization reaction. However, the catalyst is not necessarily deactivated. In the case of deactivating the catalyst a method for deactivating a catalyst by addition of a known acidic substance can be preferably carried out. Specific examples of such an acidic substance, which can be preferably used herein, include: esters such as butyl benzoate; aromatic sulfonic acids such as p-toluenesulfonic acid; aromatic sulfonic acid esters such as butyl p-toluenesulfonate or hexyl p-toluenesulfonate; phosphoric acids such as phosphorous acid, phosphoric acid, or phosphonic acid; phosphorous acid esters such as triphenyl phosphite, monophenyl phosphite, diphenyl phosphite, diethyl phosphite, di-n-propyl phosphite, di-n-butyl phosphite, di-n-hexyl phosphite, dioctyl phosphite, or monooctyl phosphite; phosphoric acid esters such as triphenyl phosphate, diphenyl phosphate, monophenyl phosphate, dibutyl phosphate, dioctyl phosphate, or monooctyl phosphate; phosphonic acids such as diphenyl phosphonate, dioctyl phosphonate, or dibutyl phosphonate; phosphonic acid esters such as diethyl phenylphosphonate; phosphines such as triphenylphosphine or bis(diphenylphosphino)ethane; boric acids such as boric acid or phenylbonic acid; aromatic sulfonates such as tetrabutylphosphonium dodecylbenzenesulfonate; organic halides such as stearoyl chloride, benzoyl chloride, or p-toluenesulfonyl chloride; alkyl sulfates such as dimethyl sulfate; and organic halides such as benzyl chloride. From the viewpoint of the effects of the deactivator, the stability to the resin, etc., p-toluene or butyl sulfonate is particularly preferable. The deactivator is used in a molar amount that is 0.01 to 50 times, and preferably 0.3 to 20 times higher than the amount of the catalyst. If the molar amount of the deactivator is smaller than 0.01 time the molar amount of the catalyst, deactivation effects unfavorably become insufficient. On the other hand, if the molar amount of the deactivator is larger than 50 times the molar amount of the catalyst, the heat resistance of the resin is reduced, and the obtained molded body is unfavorably easily colored.

The deactivator may be kneaded immediately after completion of the polymerization reaction. Otherwise, the deactivator may also be kneaded, after the resin has been pelletized after completion of the polymerization. Moreover, in addition to the deactivator, other additives (e.g., the after-mentioned antioxidant, release agent, ultraviolet absorber, fluidity modifier, crystal nucleating agent, reinforcer, dye, antistatic agent, antibacterial agent, etc.) can also be added by the same method as described above.

After deactivation of the catalyst (or, after completion of the polymerization reaction, if the activator is not added), it may be appropriate to establish a step of devolatizing and removing low-boiling-point compounds from the polymer under a pressure of 0.1 to 1 mmHg and at a temperature of 200° C. to 350° C. The temperature applied upon such devolatilization and removal is preferably 230° C. to 300° C., and more preferably 250° C. to 270° C. In this step, a horizontal device equipped with an impeller having excellent surface renewal capacity, such as a paddle blade, a lattice blade or a spectacle blade, or a thin-film evaporator is preferably used.

(Other Additive Components)

To the thermoplastic resin, additives such as an antioxidant, a processing stabilizer, a light stabilizer, a polymerization metal inactivating agent, a fire retardant, a lubricant, an antistatic agent, a surfactant, an antibacterial agent, a release agent, an ultraviolet absorber, a plasticizer, and a compatibilizer may be added, in the range in which they do not impair the characteristics of the present invention.

Examples of the antioxidant include triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], pentaerythritol-tetrakis [3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphosphonate-diethyl ester, tris(3,5-di-tert-butyl-4-hydroxybenzyl)isocyanurate, and 3,9-bis {1,1-dimethyl-2-[β-(3-tert-butyl-4-hydroxy-5-methylphenyl)propionyloxy] ethyl}-2,4,8,10-tetraoxaspiro(5,5)undecane. The content of the antioxidant is preferably 0.001 to 0.3 parts by weight based on 100 parts by weight of the thermoplastic resin.

Examples of the processing stabilizer include a phosphorus-based processing heat stabilizer and a sulfur-based processing heat stabilizer. Examples of the phosphorus-based processing heat stabilizer include phosphorous acid, phosphoric acid, phosphonous acid, phosphonic acid, and esters thereof. Specific examples include triphenyl phosphite, tris (nonylphenyl) phosphite, tris(2,4-di-tert-butylphenyl) phosphite, tris(2,6-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl) pentaerythritol diphosphite, 2,2-methylenebis(4,6-di-tert-butylphenyl)octyl phosphite, bis(nonylphenyl) pentaerythritol diphosphite, bis(2,4-dicumylphenyl) pentaerythritol diphosphite, bis(2,4-di-tert-butylphenyl) pentaerythritol diphosphite, distearylpentaerythritol diphosphite, tributyl phosphate, triethyl phosphate, trimethyl phosphate, triphenyl phosphate, diphenylmonoorthoxenyl phosphate, dibutyl phosphate, dioctyl phosphate, diisopropyl phosphate, dimethyl benzenephosphonate, diethyl benzenephosphonate, dipropyl benzenephosphonate, tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite, bis(2,4-di-tert-butylphenyl)-4-phenyl-phenyl phosphonite, and bis(2,4-di-tert-butylphenyl)-3-phenyl-phenyl phosphonite. The content of the phosphorus-based processing heat stabilizer is preferably 0.001 to 0.2 parts by weight based on 100 parts by weight of the thermoplastic resin.

Examples of the sulfur-based processing heat stabilizer include pentaerythritol-tetrakis(3-laurylthiopropionate), pentaerythritol-tetrakis(3-mristylthiopropionate), pentaerythritol-tetrakis(3-stearylthiopropionate), dilaurl-3,3'-thiodipropionate, dimyristyl-3,3'-thiodipropionate, and distearyl-3,3'-thiodipropionate. The content of the sulfur-based processing heat stabilizer is preferably 0.001 to 0.2 parts by weight based on 100 parts by weight of the thermoplastic resin.

A preferred release agent is a release agent, 90% by weight or more of which consists of esters of alcohol and fatty acid. Specific examples of such esters of alcohol and fatty acid include esters of monohydric alcohol and fatty acid, and partial esters or total esters of polyhydric alcohol and fatty acid. The above-described esters of monohydric alcohol and fatty acid are preferably esters of monohydric alcohol containing 1 to 20 carbon atoms and saturated fatty acid containing 10 to 30 carbon atoms. Moreover, the above-described partial esters or total esters of polyhydric alcohol and fatty acid are preferably partial esters or total esters of polyhydric alcohol containing 1 to 25 carbon atoms and saturated fatty acid containing 10 to 30 carbon atoms.

Specific examples of the esters of monohydric alcohol and saturated fatty acid include stearyl stearate, palmityl palmitate, butyl stearate, methyl laurate, and isopropyl palmitate. Specific examples of the partial esters or total esters of polyhydric alcohol and saturated fatty acid include total esters or partial esters of dipentaerythritol, such as monoglyceride stearate, diglyceride stearate, triglyceride stearate, monosorbitate stearate, monoglyceride behenate, monoglyceride caprate, monoglyceride laurate, pentaerythritol monostearate, pentaerythritol tetrastearate, pentaerythritol tetrapelargonate, propylene glycol monostearate, biphenyl biphenate, sorbitan monostearate, 2-ethylhexyl stearate, or dipentaerythritol hexastearate. Among these compounds, monoglyceride stearate and monoglyceride laurate are particularly preferable. The content of such a release agent is preferably in the range of 0.005 to 2.0 parts by weight, more preferably in the range of 0.01 to 0.6 parts by weight, and further preferably in the range of 0.02 to 0.5 parts by weight, based on 100 parts by weight of the thermoplastic resin.

A preferred ultraviolet absorber is at least one ultraviolet absorber selected from the group consisting of a benzotriazole-based ultraviolet absorber, a benzophenone-based ultraviolet absorber, a triazine-based ultraviolet absorber, a cyclic imino ester-based ultraviolet absorber and a cyanoacrylate-based ultraviolet absorber. That is to say, the following ultraviolet absorbers may be used alone or in combination of two or more types.

Examples of the benzotriazole-based ultraviolet absorber include 2-(2-hydroxy-5-methylphenyl)benzotriazole, 2-(2-hydroxy-5-tert-octylphenyl)benzotriazole, 2-(2-hydroxy-3,5-dicumylphenyl)phenylbenzotriazole, 2-(2-hydroxy-3-tert-butyl-5-methylphenyl)-5-chlorobenzotriazole, 2,2'-methylenebis[4-(1,1,3,3-tetramethylbutyl)-6-(2N-benzotriazol-2-yl)phenol], 2-(2-hydroxy-3,5-di-tert-butylphenyl)benzotriazole, 2-(2-hydroxy-3,5-di-tert-butylphenyl)-5-chlorobenzotriazole, 2-(2-hydroxy-3,5-di-tert-amylphenyl)benzotriazole, 2-(2-hydroxy-5-tert-octylphenyl)benzotriazole, 2-(2-hydroxy-5-tert-butylphenyl)benzotriazole, 2-(2-hydroxy-4-octoxyphenyl)benzotriazole, 2,2'-methylenebis(4-cumyl-6-benzotriazolephenyl), 2,2'-p-phenylenebis(1,3-benzoxazin-4-one), and 2-[2-hydroxy-3-(3,4,5,6-tetrahydrophthalimidemethyl)-5-methylphenyl]benzotriazole.

Examples of the benzophenone-based ultraviolet absorber include 2,4-dihydroxybenzophenone, 2-hydroxy-4-methoxybenzophenone, 2-hydroxy-4-octoxybenzophenone, 2-hydroxy-4-benzyloxybenzophenone, 2-hydroxy-4-methoxy-5-sulfoxybenzophenone, 2-hydroxy-4-methoxy-5-sulfoxytrihydridatebenzophenone, 2,2'-dihydroxy-4-methoxybenzophenone, 2,2',4,4'-tetrahydroxybenzophenone, 2,2'-dihydroxy-4,4'-dimethoxybenzophenone, 2,2'-dihydroxy-4,4'-dimethoxy-5-sodium sulfoxybenzophenone, bis(5-benzoyl-4-hydroxy-2-methoxyphenyl)methane, 2-hydroxy-4-n-dodecyloxybenzophenone, and 2-hydroxy-4-methoxy-2'-carboxybenzophenone.

Examples of the triazine-based ultraviolet absorber include 2-(4,6-diphenyl-1,3,5-triazin-2-yl)-5-[(hexyl)oxy]-phenol and 2-(4,6-bis(2,4-dimethylphenyl)-1,3,5-triazin-2-yl)-5-[(octyl)oxy]-phenol.

Examples of the cyclic imino ester-based ultraviolet absorber include 2,2'-bis(3,1-benzoxazin-4-one), 2,2'-p-phenylenebis(3,1-benzoxazin-4-one), 2,2'-m-phenylenebis(3,1-benzoxazin-4-one), 2,2'-(4,4'-diphenylene)bis(3,1-benzoxazin-4-one), 2,2'-(2,6-naphthalene)bis(3,1-benzoxazin-4-one), 2,2'-(1,5-naphthalene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one), and 2,2'-(2-chloro-p-phenylene)bis(3,1-benzoxazin-4-one).

Examples of the cyanoacrylate-based ultraviolet absorber include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

The content of the ultraviolet absorber is preferably 0.01 to 3.0 parts by weight, more preferably 0.02 to 1.0 parts by weight, and further preferably 0.05 to 0.8 parts by weight, based on 100 parts by weight of the thermoplastic resin. If the ultraviolet absorber is used in such a mixed amount, it is possible to impart sufficient weather resistance to the thermoplastic resin, depending on intended use.

In addition to the aforementioned thermoplastic resin, other resins may also be used in combination, in the range in which they do not impair the characteristics of the present invention. That is to say, the thermoplastic resin of the present invention may be provided in the form of a resin composition comprising multiple types of resins. The resin composition comprises at least a thermoplastic resin containing 1% to 100% by weight of the repeating unit represented by the above formula (1).

Examples of other resins are as follows:
polyethylene, polypropylene, polyvinyl chloride, polystyrene, a (meth)acrylic resin, an ABS resin, polyamide, polyacetal, polycarbonate (provided that it does not comprise the constituting unit (1)'), polyphenylene ether, polyester (provided that it does not comprise the constituting unit (1)'), polyester carbonate (provided that it does not comprise the constituting unit (1)'), polyphenylene sulfide, polyimide, polyether sulfone, polyether ether ketone, a fluorine resin, a cycloolefin polymer, an ethylene-vinyl acetate copolymer, an epoxy resin, a silicone resin, a phenolic resin, an unsaturated polyester resin, and polyurethane.

The content of other resins, which may be optionally comprised, is preferably 20 parts by mass or less, and more preferably 10 parts by mass or less, based on the total mass of the thermoplastic resin comprising the constituting unit derived from the dihydroxy compound of the above formula (1). If the content of other resins is too high, there may be a case where compatibility is deteriorated and the transparency of the resin composition is reduced.

(Physical Properties of Thermoplastic Resin)

The thermoplastic resin of the present invention (a molded body produced from the thermoplastic resin) has a saturated water absorption rate of 0.39% by weight or less, and preferably 0.38% by weight or less. The saturated water absorption rate of a resin can be measured by the method described in the after-mentioned Examples.

The thermoplastic resin of the present invention (a molded body produced from the thermoplastic resin) has a YI value of 19 or less, preferably 18 or less, and more preferably 17 or less. The YI value of a resin can be measured by the method described in the after-mentioned Examples.

(Molded Body)

Using the thermoplastic resin of the present invention, a molded body (e.g., an optical element) can be produced. Such a molded body can be molded, for example, by any given method, such as an injection molding method, a compression molding method, an extrusion molding method, or a solution casting method. The optical element produced using the thermoplastic resin according to the embodiment is preferably used for lenses, prisms, etc.

Molded products produced by these methods are used for various types of glazing uses, lenses for automobile lamps, lamp covers, optical lenses, OHP sheets, nameplates, display lights, etc. In addition, the films produced by such methods are preferably used as Placell substrates or phase difference films for the intended use of flat panel display substrates. For such Placell substrates, the films are used without being stretched. However, for the use as phase difference films, the films are subjected to stretch orientation, at least, in the uniaxial direction, so that the phase difference films can have optimal birefringence characteristics.

(Optical Lens)

Using the thermoplastic resin of the present invention, an optical lens can be produced. The optical lens produced using the thermoplastic resin according to the embodiment has a high refractive index and is excellent in heat resistance. Hence, the optical lens can be used in the field in which expensive glass lenses with a high refractive index have conventionally been used, such as a telescope, binoculars and a television projector, and thus, it is extremely useful. The optical lens is preferably used in the form of an aspherical lens, as necessary. Since a single aspherical lens is able to set the spherical aberration to be substantially zero, it is not necessary to remove the spherical aberration by a combination of multiple spherical lenses, and thus, it enables weight reduction and a reduction in production costs. Accordingly, such an aspherical lens is particularly useful as a camera lens, among optical lenses The optical lens is formed by any given method such as an injection method, a compression molding method, or an injection compression molding method. Using the thermoplastic resin according to the embodiment, an aspherical lens having a high refractive index and low birefringence, which is technically difficult to be processed from a glass lens, can be obtained more easily.

When the optical lens of the present invention is produced by injection molding, molding is preferably carried out under conditions of a cylinder temperature of 230° C. to 270° C. and a metallic mold temperature of 100° C. to 140° C. According to such molding conditions, an optical lens having excellent physical properties and also having the function of cutting the wavelength of an ultraviolet region can be obtained. Thus, when the produced optical lens is used as a lens for digital cameras, the influence of ultraviolet ray on an image sensor can be prevented without using an ultraviolet filter. In contrast, when the resin composition of the present invention is used as an ultraviolet filter, since it has extremely high transparency, the image quality of the taken photographs is not deteriorated, and clear photographs can be taken.

Moreover, since the resin of the embodiment has high fluidity, it can be a thin and small optical lens having a complicated shape. With regard to the specific size of the lens, the thickness of the central portion is 0.05 to 3.0 mm, more preferably 0.05 to 2.0 mm, and further preferably 0.1 to 2.0 mm. In addition, the diameter is 1.0 mm to 20.0 mm, more preferably 1.0 to 10.0 mm, and further preferably 3.0 to 10.0 mm.

On the surface of the optical lens of the present invention, a coating layer such as an anti-reflection layer or a hard coat layer may be established, as necessary. The anti-reflection layer may be a single layer or multiple layers. It may also be an organic matter or an inorganic matter, but it is preferably an inorganic matter. Specific examples include oxides or fluorides, such as silicon oxide, aluminum oxide, zirconium oxide, titanium oxide, cerium oxide, magnesium oxide or magnesium fluoride. Moreover, the optical lens of the present invention may also be molded by any given method such as metal molding, cutting, polishing, laser processing, electrical discharge machining, or edging. Among these methods, metal molding is more preferable.

In order to reduce the mixing of foreign matters into the optical lens to the minimum, the molding environment must be a low-dust environment, and the environment has a class of preferably 6 or less, and more preferably 5 or less.

(Optical Film)

Using the thermoplastic resin of the present invention, an optical film can be produced. Since the optical film produced using the thermoplastic resin according to the embodiment is excellent in transparency and heat resistance, it is preferably used for films for liquid crystal substrates, optical memory cards, etc.

It is to be noted that the "sheet" generally means a thin and flat product, the thickness of which is relatively small, in consideration of the length and width thereof, and that the "film" is a thin and flat product, the thickness of which is extremely small, in consideration of the length and width thereof, wherein the highest thickness is arbitrarily limited, and it is generally supplied in the form of a roll. In the present description, however, the "sheet" is not clearly distinguished from the "film." and they are both used to have the same meaning.

The film formed from the thermoplastic resin of the present invention has good heat resistance and hue. For example, the resin composition is dissolved in an organic solvent such as methylene chloride, tetrahydrofuran or dioxane, and is then molded into a casting film. Thereafter, a gas barrier film or a solvent-resistant film is applied to both sides of this film. Otherwise, together with a transparent conductive film or a polarizing plate, the film is preferably used as a film for liquid crystal substrates (Placell substrate), or as a liquid crystal display film such as a phase difference film. Specifically, the film can be advantageously used for various display devices such as a tablet, a smart phone or a handy terminal.

EXAMPLES

Hereinafter, the present invention will be more specifically described in the following examples. However, these examples are not intended to limit the scope of the present invention.

1. Production Example of Polycarbonate Resin

A polycarbonate resin was evaluated by the following methods.

1) Polystyrene-Relative Weight Average Molecular Weight (Mw):

Tetrahydrofuran was used as a developing solvent, and a calibration curve was produced according to GPC, using standard polystyrene having a known molecular weight (molecular weight distribution: 1). Based on the produced calibration curve, the polystyrene-relative weight average molecular weight (Mw) was calculated from the retention time in GPC.

2) HPLC Measurement Conditions: Contents of BHEBN, Compound (A), Compound (B), and Compound (C)
  LC measurement device: LC-2010A, manufactured by Shimadzu Corporation
  Column: YMC-Pack ODS-AM (4.6 mm in diameter×250 mm, particle diameter: 5 μm)
  Column temperature: 25° C.
  Mobile phase solvent: Pure water/acetonitrile (acetonitrile 20%→95%)
  Flow rate: 1.0 mL/min
  Detection method: UV (detection wavelength: 254 nm)
  In the measurement results, the symbol % indicates the area percentage value corrected by removing the solvent in HPLC, unless otherwise specified.
3) Saturated Water Absorption Rate (%):
  Using a disk (diameter: 40 mm, thickness: 3 mm) prepared by press molding the obtained polycarbonate resin, the saturated water absorption rate was measured in accordance with JIS-K-7209.
4) YI:
  A quartz glass cell was filled with pellets, and the YI value was then measured using a color-difference meter (SE-2000, manufactured by NIPPON DENSHOKU INDUSTRIES. Co., LTD.) by a reflection measurement method in accordance with JIS K 7373: 2006.

Synthetic Example 1

18.082 g of 1,1'-bi-2-Naphthol (0.063 moles), 12.652 g of ethylene carbonate (0.144 moles), 1.5 g of potassium carbonate, and 20 g of toluene were added to a glass reactor equipped with a stirrer, a cooler and a thermometer, and the temperature was then increased to 115° C. so that the mixture was converted to a slurry state. Thereafter, the slurry was reacted at 115° C. for 10 hours. Subsequently, the reaction mixture was diluted by addition of 18 g of toluene, and an organic solvent phase comprising the reaction mixture was then washed with 30 g of 10% sodium hydroxide solution. The organic solvent phase was further washed until the washing solution became neutral. After completion of the water washing, the organic solvent phase was refluxed and dehydrated, and was then cooled to room temperature, followed by filtration and drying, so as to obtain 2,2'-bis(2-hydroxyethoxy)-1,1'-binaphthalene as a white crystal. HPLC purity was 99.66%, the content of the compound (A) was 250 ppm, the content of the compound (B) was 30 ppm, and the compound (C) was not detected (BHEBN-1).

Synthetic Example 2

The reaction was carried out in the same manner as that of Synthetic Example 1, with the exception that the reaction was carried out at 110° C. for 10 hours, to obtain 2,2'-bis(2-hydroxyethoxy)-1,1'-binaphthalene as a white crystal. HPLC purity was 99.76%, the content of the compound (A) was 210 ppm, and the compound (B) and the compound (C) were not detected (BHEBN-2).

Synthetic Example 3

The reaction was carried out in the same manner as that of Synthetic Example 1, with the exception that the reaction was carried out at 105° C. for 12 hours, to obtain 2,2'-bis(2-hydroxyethoxy)-1,1'-binaphthalene as a white crystal. HPLC purity was 98.76%, the content of the compound (A) was 480 ppm, the content of the compound (B) was 950 ppm, and the content of the compound (C) was 200 ppm (BHEBN-3).

The results obtained by analyzing the dihydroxy compounds obtained in Synthetic Examples 1 to 3 are shown in Table 1.

TABLE 1

|  |  | HPLC purity | Compound (A) | Compound (B) | Compound (C) |
| --- | --- | --- | --- | --- | --- |
| Synthetic Ex. 1 | BHEBN-1 | 99.66% | 250 ppm | 30 ppm | — |
| Synthetic Ex. 2 | BHEBN-2 | 99.76% | 210 ppm | — | — |
| Synthetic Ex. 3 | BHEBN-3 | 98.76% | 480 ppm | 950 ppm | 200 ppm |

Example 1

20.360 g of BHEBN-1 (0.054 moles) obtained in Synthetic Example 1, 32.954 g of 9,9-bis(4-(2-hydroxyethoxy)phenyl)fluorene (0.075 moles) (hereinafter also abbreviated as "BPEF"), 28.521 g of diphenyl carbonate (0.133 moles) (hereinafter also abbreviated as "DPC"), and 6 μmoles/moles sodium hydrogen carbonate used as a catalyst (wherein the sodium hydrogen carbonate was indicated with the number of moles based on a sum of BHEBN-1 and BPEF, and was added in the state of a 0.1 wt % aqueous solution) were added into a 500-mL glass reactor equipped with a stirrer and a distillation apparatus. Thereafter, the reactor was heated to 180° C. under 760 Torr in a nitrogen atmosphere. Ten minutes after initiation of the heating, complete dissolution of the raw materials was confirmed, and the stirring of the mixed solution was then initiated. Thereafter, stirring was carried out for 110 minutes under the same conditions as described above. During this operation, it was confirmed that phenol generated as a by-product started to be distillated. Subsequently, the degree of vacuum was adjusted to 20 Torr, and at the same time, the temperature was increased to 200° C. at a rate of 60° C./hr. Thereafter, the temperature was retained at 200° C. for 20 minutes, and the reaction was carried out. Thereafter, the temperature was increased to 230° C. at a rate of 75° C./hr. Ten minutes after completion of the temperature rising, while the temperature was retained at 230° C., the degree of vacuum was reduced to 1 Torr over 1 hour. After that, the temperature was increased to 240° C. at a rate of 60° C./hr, and the reaction was further carried out under stirring for 20 minutes. After completion of the reaction, the inside of the reactor was returned to ordinary pressure by introducing nitrogen therein, and the generated polycarbonate resin was then collected. The evaluation of the obtained resin is shown in Table 2.

Example 2

19.787 g of BHEBN-1 (0.053 moles) obtained in Synthetic Example 1, 39.756 g of 9,9-bis(4-(2-hydroxyethoxy)-3-phenylphenyl)fluorene (0.067 moles) (hereinafter also abbreviated as "BPPEF"), 26.078 g of DPC (0.122 moles), and 6 μmoles/moles sodium hydrogen carbonate used as a catalyst (wherein the sodium hydrogen carbonate was indicated with the number of moles based on a sum of BHEBN-1 and BPPEF, and was added in the state of a 0.1 wt % aqueous solution) were added into a glass reactor equipped with a stirrer and a distillation apparatus. Thereafter, the reactor was heated to 180° C. under 760 Torr in a nitrogen atmosphere. Ten minutes after initiation of the heating, complete dissolution of the raw materials was confirmed, and the stirring of the mixed solution was then initiated. Thereafter, stirring was carried out for 110 minutes under the same conditions as described above. During this operation, it was confirmed that phenol generated as a by-product started to be distillated. Subsequently, the degree of vacuum was adjusted to 20 Torr, and at the same time, the temperature was increased to 200° C. at a rate of 60° C./hr. Thereafter, the temperature was retained at 200° C. for 20 minutes, and the reaction was carried out. Thereafter, the temperature was increased to 230° C. at a rate of 75° C./hr. Ten minutes after completion of the temperature rising, while the temperature was retained at 230° C., the degree of vacuum was reduced to 1 Torr over 1 hour. After that, the temperature was increased to 240° C. at a rate of 60° C./hr, and the reaction was further carried out under stirring for 20 minutes. After completion of the reaction, the inside of the reactor was returned to ordinary pressure by introducing nitrogen therein, and the generated polycarbonate resin was then collected. The evaluation of the obtained resin is shown in Table 2.

Example 3

The reaction was carried out in the same manner as that of Example 1, with the exception that BHEBN-2 obtained in Synthetic Example 2 was used. The evaluation of the obtained resin is shown in Table 2.

Example 4

The reaction was carried out in the same manner as that of Example 2, with the exception that BHEBN-2 obtained in Synthetic Example 2 was used. The evaluation of the obtained resin is shown in Table 2.

Example 5

The reaction was carried out in the same manner as that of Example 1, with the exception that 14.450 g of BHEBN-1 (0.039 moles) obtained in Synthetic Example 1, 40.000 g of 9,9-bis(4-(2-hydroxyethoxy)phenyl)fluorene (BPEF) (0.091 moles), 28.521 g of diphenyl carbonate (DPC) (0.133 moles), and 6 μmoles/moles sodium hydrogen carbonate serving as a catalyst (w % herein the sodium hydrogen carbonate was indicated with the number of moles based on a sum of BHEBN-1 and BPEF, and was added in the state of a 0.1 wt % aqueous solution) were used as raw materials. The evaluation of the obtained resin is shown in Table 2.

Example 6

The reaction was carried out in the same manner as that of Example 1, with the exception that 23.000 g of BHEBN-1 (0.061 moles) obtained in Synthetic Example 1, 18.000 g of BPEF (0.041 moles), 22.500 g of DPC (0.105 moles), and 6 μmoles/moles sodium hydrogen carbonate serving as a catalyst (wherein the sodium hydrogen carbonate was indicated with the number of moles based on a sum of BHEBN-1 and BPEF, and was added in the state of a 0.1 wt % aqueous solution) were used as raw materials. The evaluation of the obtained resin is shown in Table 2.

Example 7

The reaction was carried out in the same manner as that of Example 2, with the exception that 12.000 g of BHEBN-1 (0.032 moles) obtained in Synthetic Example 1, 44.000 g of 9,9-bis(4-(2-hydroxyethoxy)-3-phenylphenyl)fluorene (BPPEF) (0.074 moles), 23.400 g of DPC (0.109 moles), and 6 μmoles/moles sodium hydrogen carbonate serving as a catalyst (wherein the sodium hydrogen carbonate was indicated with the number of moles based on a sum of BHEBN-1 and BPPEF, and was added in the state of a 0.1 wt % aqueous solution) were used as raw materials.

Example 8

The reaction was carried out in the same manner as that of Example 2, with the exception that 20.000 g of BHEBN-1 (0.053 moles) obtained in Synthetic Example 1, 21.000 g of BPPEF (0.036 moles), 19.600 g of DPC (0.091 moles), and 6 μmoles/moles sodium hydrogen carbonate serving as a catalyst (wherein the sodium hydrogen carbonate was indicated with the number of moles based on a sum of BHEBN-1 and BPPEF, and was added in the state of a 0.1 w % aqueous solution) were used as raw materials.

Comparative Example 1

The reaction was carried out in the same manner as that of Example 1, with the exception that BHEBN-3 obtained in Synthetic Example 3 was used. The evaluation of the obtained resin is shown in Table 2.

Comparative Example 2

The reaction was carried out in the same manner as that of Example 2, with the exception that BHEBN-3 obtained in Synthetic Example 3 was used. The evaluation of the obtained resin is shown in Table 2.

Comparative Example 3

18.120 g of BHEBN-3 (0.048 moles) obtained in Synthetic Example 3, 29.899 g of 9,9-bis(4-(2-hydroxyethoxy) phenyl)fluorene (BPEF) (0.068 moles), 25.600 g of diphenyl carbonate (DPC) (0.120 moles), and 6 μmoles/moles sodium hydrogen carbonate used as a catalyst (wherein the sodium hydrogen carbonate was indicated with the number of moles based on a sum of BHEBN-1 and BPEF, and was added in the state of a 0.1 wt % aqueous solution) were added into a glass reactor equipped with a stirrer and a distillation apparatus. Thereafter, the reactor was heated to 180° C. under 760 Torr in a nitrogen atmosphere. Ten minutes after initiation of the heating, complete dissolution of the raw materials was confirmed, and the stirring of the mixed solution was then initiated. Thereafter, stirring was carried out for 110 minutes under the same conditions as described above. During this operation, it was confirmed that phenol generated as a by-product started to be distillated. Subsequently, the degree of vacuum was adjusted to 20 Torr, and at the same time, the temperature was increased to 200° C. at a rate of 60° C./hr. Thereafter, the temperature was retained at 200° C. for 20 minutes, and the reaction was carried out. Thereafter, the temperature was increased to 230° C. at a rate of 75° C./hr. Ten minutes after completion of the temperature rising, while the temperature was retained at 230° C., the degree of vacuum was reduced to 1 Torr over 1 hour. After that, the temperature was increased to 240° C. at a rate of 60° C./hr, and the reaction was further carried out under stirring for 40 minutes. After completion of the reaction, the inside of the reactor was returned to ordinary pressure by introducing nitrogen therein, and the generated polycarbonate resin was then collected. The evaluation of the obtained resin is shown in Table 2.

Comparative Example 4

17.800 g of BHEBN-1 (0.048 moles) obtained in Synthetic Example 1, 36.420 g of 9,9-bis(4-(2-hydroxyethoxy)-3-phenylphenyl)fluorene (0.062 moles) (hereinafter also abbreviated as "BPPEF"), 23.646 g of DPC (0.110 moles), and 6 μmoles/moles sodium hydrogen carbonate used as a catalyst (wherein the sodium hydrogen carbonate was indicated with the number of moles based on a sum of BHEBN-1 and BPPEF, and was added in the state of a 0.1 wt % aqueous solution) were added into a glass reactor equipped with a stirrer and a distillation apparatus. Thereafter, the reactor was heated to 180° C. under 760 Torr in a nitrogen atmosphere. Ten minutes after initiation of the heating, complete dissolution of the raw materials was confirmed, and the stirring of the mixed solution was then initiated. Thereafter, stirring was carried out for 110 minutes under the same conditions as described above. During this operation, it was confirmed that phenol generated as a by-product started to be distilled. Subsequently, the degree of vacuum was adjusted to 20 Torr, and at the same time, the temperature was increased to 200° C. at a rate of 60° C./hr. Thereafter, the temperature was retained at 200° C. for 20 minutes, and the reaction was carried out. Thereafter, the temperature was increased to 230° C. at a rate of 75° C./hr. Ten minutes after completion of the temperature rising, while the temperature was retained at 230° C., the degree of vacuum was reduced to 1 Torr over 1 hour. After that, the temperature was increased to 240° C. at a rate of 60° ° C./hr, and the reaction was further carried out under stirring for 40 minutes. After completion of the reaction, the inside of the reactor was returned to ordinary pressure by introducing nitrogen therein, and the generated polycarbonate resin was then collected. The evaluation of the obtained resin is shown in Table 2.

The composition, Mw (weight average molecular weight), saturated water absorption rate, and YI of the resins obtained in the above-described examples and comparative examples are shown in Table 2.

It is found that the polycarbonate resins obtained in Examples 1 to 8, in which raw materials comprising reduced contents of the compounds of the formulae (A) to (C) were used, have a low saturated water absorption rate, such as 0.35% to 0.39% by weight.

It is found that the saturated water absorption rate of the resins is significantly decreased, particularly when a raw material (BHEBN-2) comprising significantly reduced contents of the compounds of the formulae (A) to (C) was used (Examples 3 and 4).

On the other hand, it is found that the polycarbonate resins obtained in Comparative Examples 1 to 4, in which the contents of the compounds of the formulae (A) to (C) were large, have a high saturated water absorption rate, such as 0.40% by weight or more.

Moreover, it was found that, in Examples 1 to 8 in which raw materials comprising reduced contents of the compounds of the formulae (A) to (C) were used, an increase in the molecular weight of the obtained polycarbonate resin and excellent hue (i.e., a low YI value) were obtained, in comparison to Comparative Examples 1 and 2 in which the dihydroxy compound having the same structure was used.

Furthermore, the carbonate resins of Examples 1 to 4, 5, and 7, in which the molar ratio between the dihydroxy compound of the formula (1) and the dihydroxy compound of the formula (2) (constituting unit (1)'/constituting unit (2)') was 30/70 to 50/50 (in particular. Examples 1 to 4, in which the molar ratio was 40/60 to 50/50) have a reduced saturated water absorption rate, in comparison to the carbonate resins of Examples 6 and 8, in which the dihydroxy compound having the same structure was used.

Further, it is confirmed that, in Comparative Examples 3 and 4, high-molecular-weight polycarbonate resins were obtained by prolonging the polymerization reaction time, in comparison to Comparative Examples 1 and 2, but the polycarbonate resins of Comparative Examples 3 and 4 were inferior to those of Comparative Examples 1 and 2, in terms of hue (i.e., a high YI value).

2. Production Example of Film

A film was evaluated by the following methods.

(1) Total Light Transmittance and Haze

Total light transmittance and haze were measured using a hazemeter ("HM-150," manufactured by MURAKAMI COLOR RESEARCH LABORATORY CO., Ltd.), in accordance with JIS K-7361-1: 1997 and JIS K-7136: 2000.

(2) Glass Transition Temperature

Glass transition temperature was measured using a differential thermal scanning calorimeter (DSC) (measuring device: DSC7000X, manufactured by Hitachi High-Tech Science Corporation DSC7000X).

TABLE 2

|  |  | Copolymerization ratio (mole %) | | | | Saturated water | |
|---|---|---|---|---|---|---|---|
|  | BHEBN | BHEBN | BPEF | BPPEF | Mw | absorption rate (wt %) | Pellet YI |
| Example 1 | BHEBN-1 | 42 | 58 | — | 43000 | 0.37 | 16 |
| Example 2 | BHEBN-1 | 44 | — | 56 | 53000 | 0.38 | 14 |
| Example 3 | BHEBN-2 | 42 | 58 | — | 44000 | 0.35 | 18 |
| Example 4 | BHEBN-2 | 44 | — | 56 | 54000 | 0.36 | 17 |
| Example 5 | BHEBN-1 | 30 | 70 | — | 43000 | 0.38 | 14 |
| Example 6 | BHEBN-1 | 60 | 40 | — | 44000 | 0.39 | 15 |
| Example 7 | BHEBN-1 | 30 | — | 70 | 53000 | 0.38 | 19 |
| Example 8 | BHEBN-1 | 60 | — | 40 | 54000 | 0.39 | 18 |
| Comp. Ex. 1 | BHEBN-3 | 42 | 58 | — | 40000 | 0.41 | 19 |
| Comp. Ex. 2 | BHEBN-3 | 44 | — | 56 | 50000 | 0.42 | 18 |
| Comp. Ex. 3 | BHEBN-3 | 42 | 58 | — | 45000 | 0.40 | 21 |
| Comp. Ex. 4 | BHEBN-3 | 44 | — | 56 | 55000 | 0.41 | 22 |

BPEF: 9,9-bis(4-(2-hydroxyethoxy)phenyl)fluorene

BPPEF: 9,9-bis(4-(2-hydroxyethoxy)-3-phenylphenyl)fluorene

BHEBN: 2,2'-bis(2-hydroxyethoxy)-1,1'-binaphthalene

BPA: 2,2-bis(4-hydroxyphenyl)propane

DPC: diphenyl carbonate (3) Surface Shape

The surface shape of a light diffusion film was evaluated using arithmetic average roughness. Arithmetic average roughness was obtained by preparing a roughness curve using a small surface roughness measuring device ("SURFTEST SJ-210," manufactured by Mitutoyo Corporation), and then calculating the roughness as follows. That is, the range of a reference length (1) (average line direction) was extracted from the prepared roughness curve, and thereafter. X axis was set in the direction of an average line of this extracted portion, whereas Y axis was set in a direction perpendicular to the X axis. When the roughness curve was represented by y=f(x), the value (μm) obtained by the following expression was defined as an arithmetic average roughness (Ra). Herein, the term "reference length (1) (average line direction)" is used to mean the reference length of a roughness parameter according to JIS B 0601: 2001 (ISO 4287: 1997).

$$Ra = \frac{1}{\ell} \int_0^\ell |f(x)| \, dx$$

(5) Refractive Index

The refractive index of a film having a thickness of 0.1 mm was measured using an Abbe's refractometer according to the method of JIS-K-7142 (23° C., wavelength: 589 nm).

(6) Abbe Number (ν)

The refractive indexes of a film having a thickness of 0.1 mm at 23° C. at wavelengths of 486 nm, 589 nm and 656 nm were measured using an Abbe's refractometer, and thereafter, the Abbe number (ν) thereof was further calculated according to the following formula:

ν=(nD−1)/(nF−nC)

nD: refractive index at a wavelength of 589 nm
nC: refractive index at a wavelength of 656 nm
nF: refractive index at a wavelength of 486 nm (7) Melt Volume Rate (MVR)

The obtained resin was vacuum-dried at 120° C. for 4 hours, and thereafter, the melt volume rate (MVR) of the resin was measured using Melt Indexer T-111 manufactured by Toyo Seiki Seisaku-sho, Ltd., under conditions of a temperature of 260° C. and a load of 2160 g.

Example 9

The reaction was carried out in the same manner as that of Example 1, with the exceptions that the amounts of BHEBN, BPEF, diphenyl carbonate (DPC), and sodium hydrogen carbonate were changed to 6.20 kg (16.56 moles), 10.00 kg (22.80 moles), 8.67 kg (40.46 moles), and 1.98× $10^{-2}$ g ($2.36 \times 10^{-4}$ moles), respectively, and that the size of the reactor was changed to 50 L. After completion of the reaction, nitrogen was introduced into the reactor, and the generated polycarbonate resin was extracted, while it was pelletized.

The obtained pellets were subjected to melt extrusion at 280° C., using a 26-mm biaxial extruder and a T die. The extruded melted film was nipped between a first cooling roll made of silicon rubber, having a diameter of 200 mm, and a second cooling roll made of metal, having a diameter of 200 mm, which had been subjected to mat-processing (arithmetic average roughness of surface: 3.2 μm). The mat pattern was formed on the surface of the film, and the film was then cooled. Then, the film was further passed through a third cooling roll made of metal, the surface of which had a mirror structure, and while the film was drawn by a draw-off roll, it was molded into a film, one surface of which was matted. During this operation, the temperature of the first cooling roll was set at 40° C., the temperature of the second cooling roll was set at 130° C., the temperature of the third cooling roll was set at 130° C., and the speed of the cooling rolls was adjusted, so that the arithmetic average roughness of the film surface was adjusted to be 3.0 μm.

The evaluation results of the film obtained in Example 9 are shown in Table 3.

TABLE 3

|  | Example 9 |
| --- | --- |
| Film thickness (μm) | 220 |
| Haze (%) | 88.6 |
| Total light transmittance (%) | 86.1 |
| Arithmetic average roughness (μm) | 3.0 |
| Glass transition temperature (° C.) | 134 |
| MVR 260° C. cm$^3$/10 min | 32 |
| Abbe number | 21.5 |
| Refractive index | 1.651 |

From the above Table 3, it is confirmed that the film produced using the polycarbonate resin of the present invention has high haze and excellent transparency, and further exhibits a low Abbe number and a high refractive index.

3. Production Example of Optical Lens

Ten thin molded products were produced using a metallic mold capable of forming a lens having a curvature radius on the convex surface of 5.73 mm, a curvature radius on the concave surface of 3.01 mm, a diameter of 4.5 mm, a diameter of a lens portion of 3 mm, and a central thickness of a lens of 0.20 mm, and employing an injection molding machine ROBOSHOT S-2000i30A, manufactured by FANUC CORPORATION, at a resin temperature of 260° C., a metallic mold temperature Tg of −5° C., and a sustaining pressure of 600 kgf/cm$^2$.

The obtained optical lenses were evaluated by the following methods.

[Evaluation of Birefringence]

The birefringence of the obtained molded products was measured using a birefringence meter (KOBRA (registered trademark)-CCD/X; manufactured by Oji Scientific Instruments), and a comparison was then made in terms of the value of retardation in the central portion of a lens at a measurement wavelength of 650 nm. The smaller the retardation value, the more excellent the low birefringence property that can be obtained. A retardation value of less than 20 was evaluated to be A, a retardation value of 20 or more and less than 40 was evaluated to be B, a retardation value of 40 or more and less than 60 was evaluated to be C, and a retardation value of 60 or more was evaluated to be D.

[Evaluation of Weld Line]

The obtained molded products were each observed under a microscope, and the length of a weld line generated in an anti-gate direction was measured. The length of the weld line that was less than 0.1 mm was evaluated to be A, 0.1 mm or more and less than 0.3 mm was evaluated to be B, 0.3 mm or more and less than 0.5 mm was evaluated to be C, and 0.5 mm or more was evaluated to be D.

Example 10

The polycarbonate resin obtained in Example 1 was vacuum-dried at 120° C. for 1 hour to produce an injection molded product. The results of the birefringence evaluation and weld line evaluation of the obtained molded product are shown in Table 4.

Example 11

The polycarbonate resin obtained in Example 2 was vacuum-dried at 120° C. for 1 hour to produce an injection molded product. The results of the birefringence evaluation and weld line evaluation of the obtained molded product are shown in Table 4.

Example 12

The polycarbonate resin obtained in Example 3 was vacuum-dried at 120° C. for 1 hour to produce an injection molded product. The results of the birefringence evaluation and weld line evaluation of the obtained molded product are shown in Table 4.

Example 13

The polycarbonate resin obtained in Example 4 was vacuum-dried at 120° C. for 1 hour to produce an injection molded product. The results of the birefringence evaluation and weld line evaluation of the obtained molded product are shown in Table 4.

Comparative Example 5

The polycarbonate resin obtained in Comparative Example 1 was vacuum-dried at 120° C. for 1 hour to produce an injection molded product. The results of the birefringence evaluation and weld line evaluation of the obtained molded product are shown in Table 4.

Comparative Example 6

The polycarbonate resin obtained in Comparative Example 2 was vacuum-dried at 120° C. for 1 hour to produce an injection molded product. The results of the birefringence evaluation and weld line evaluation of the obtained molded product are shown in Table 4.

Comparative Example 7

The polycarbonate resin obtained in Comparative Example 3 was vacuum-dried at 120° C. for 1 hour to produce an injection molded product. The results of the birefringence evaluation and weld line evaluation of the obtained molded product are shown in Table 4.

Comparative Example 8

The polycarbonate resin obtained in Comparative Example 4 was vacuum-dried at 120° C. for 1 hour to produce an injection molded product. The results of the birefringence evaluation and weld line evaluation of the obtained molded product are shown in Table 4.

Comparative Example 9

An injection molded product was produced using pellets of a polycarbonate resin (Iupilon H-4000 manufactured by Mitsubishi Engineering-Plastics Corporation; a polycarbonate resin consisting of bisphenol A (BPA-HOMO-PC)). The results of the birefringence evaluation and weld line evaluation of the obtained molded product are shown in Table 4.

TABLE 4

|  | Birefringence | Evaluation of weld line |
| --- | --- | --- |
| Example 10 | B | A |
| Example 11 | B | A |
| Example 12 | B | B |
| Example 13 | B | B |
| Comp. Example 5 | B | C |
| Comp. Example 6 | C | D |
| Comp. Example 7 | B | D |
| Comp. Example 8 | B | D |
| Comp. Example 9 | D | A |

From the above Table 4, the optical lenses produced using the polycarbonate resin of the present invention had low birefringence (evaluation of B).

Moreover, the optical lenses of the present invention had a short weld line (evaluation of A or B). It is assumed that this is because the polycarbonate resin of the present invention has a good saturated water absorption rate and also because generation of decomposition gas is suppressed when the polycarbonate resin of the present invention is used. In general, the weld line is influenced by factors such as accumulation of gas in a metallic mold, molding conditions (a molding temperature, a metallic mold temperature, a pressure, etc.), and generation of decomposition gas. It is assumed that the polycarbonate resin of the present invention is able to reduce the abundance of OH (water, aromatic OH, etc.) in the system by using raw materials in which the contents of the compounds of the formulae (A) to (C) are reduced, and that this would lead to suppression of transesterification, so that generation of decomposition gas could be suppressed.

Accordingly, by using the polycarbonate resin of the present invention, the length of the weld line can be reduced without performing the conventional measures for reducing the weld line length (e.g., measures using metallic molds (e.g., the establishment of a vent, the adjustment of the thickness of a metallic mold, the adjustment of a gate, etc.)), and therefore, the polycarbonate resin of the present invention is advantageous in terms of production costs and the easiness of the production.

Several embodiments of the present invention are described above. However, these embodiments are provided as examples, and thus, are not intended to limit the scope of the present invention. These novel embodiments can be carried out in various other forms, and various abbreviations, substitutions, and alternations can also be carried out in a range in which such modification is not deviated from the gist of the present invention. These embodiments and the modifications thereof are included in the scope or gist of the invention, and are also included in the invention described in claims and in a scope equivalent thereto.

What claimed is:

1. A dihydroxy compound comprising a dihydroxy compound represented by the following formula (1), wherein
    the total weight of a compound represented by the following formula (A), a compound represented by the following formula (B), and a compound represented by the following formula (C) in the dihydroxy compound is 1 ppm or more and 1,500 ppm or less, based on 100 parts by weight of the dihydroxy compound represented by the formula (1):

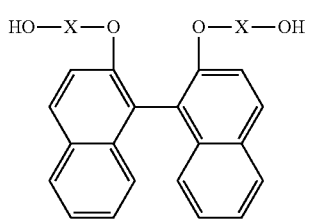

wherein X represents an alkylene group containing 1 to 4 carbon atoms,

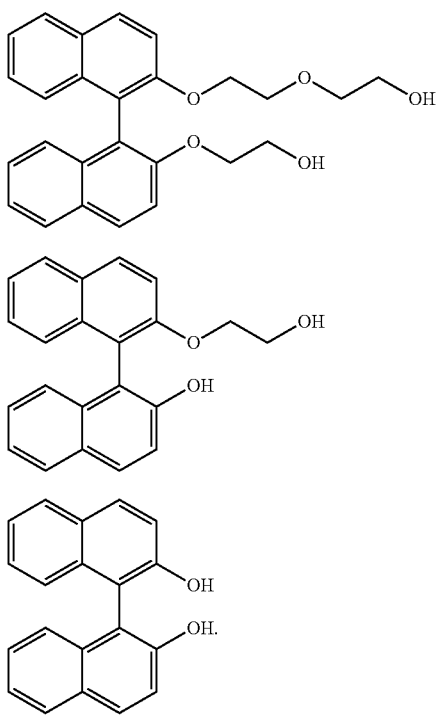

2. The compound according to claim 1, wherein the total weight of a compound represented by the following formula (A) and a compound represented by the following formula (B) in the dihydroxy compound is 1,000 ppm or less, based on 100 parts by weight of the dihydroxy compound represented by the formula (1).

3. The compound according to claim 1, wherein the weight of the compound represented by the formula (A) in the dihydroxy compound is 300 ppm or less, based on 100 parts by weight of the dihydroxy compound represented by the formula (1).

4. The compound according to claim 1, wherein the weight of the compound represented by the formula (B) in the dihydroxy compound is 500 ppm or less, based on 100 parts by weight of the dihydroxy compound represented by the formula (1).

5. The compound according to claim 1, wherein the weight of the compound represented by the formula (C) in the dihydroxy compound is 100 ppm or less, based on 100 parts by weight of the dihydroxy compound represented by the formula (1).

6. The compound according to claim 1, wherein the purity of the dihydroxy compound represented by the formula (1) is 99% or more.

7. The compound according to any claim 1, wherein the dihydroxy compound represented by the formula (1) is at least one selected from 2,2'-bis(1-hydroxymethoxy)-1,1'-binaphthalene, 2,2'-bis(2-hydroxyethoxy)-1,1'-binaphthalene, 2,2'-bis(3-hydroxypropyloxy)-1,1'-binaphthalene, and 2,2'-bis(4-hydroxybutoxy)-1,1'-binaphthalene.

8. The compound according to claim 1, for use as a raw material for a thermoplastic resin.

9. A raw material for a thermoplastic resin which comprises as a dihydroxy component the dihydroxy compound according to claim 1, wherein the percentage of the dihydroxy compound of the formula (1) is 1 to 100 mol %, based on 100 mol % of the dihydroxy compound used as a raw material for a thermoplastic resin.

10. The raw material according to claim 9, which further comprises as the dihydroxy component a compound represented by the following formula (2):

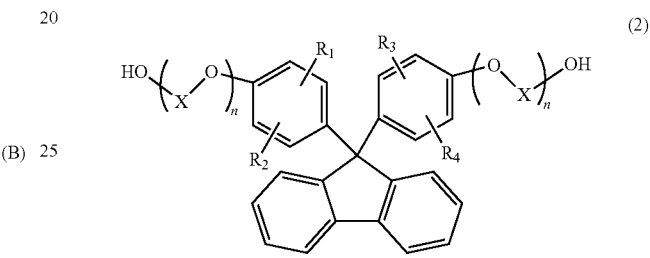

wherein $R_1$ to $R_4$ are each independently selected from the group consisting of a hydrogen atom, an alkyl group containing 1 to 20 carbon atoms, an alkoxy group containing 1 to 20 carbon atoms, a cycloalkyl group containing 5 to 20 carbon atoms, a cycloalkoxy group containing 5 to 20 carbon atoms, an aryl group containing 6 to 20 carbon atoms, an aryloxy group containing 6 to 20 carbon atoms, and a halogen atom;

X each independently represents an alkylene group containing 2 to 8 carbon atoms; and n each independently represents an integer of 1 to 5.

11. The raw material according to claim 9, wherein the thermoplastic resin is selected from the group consisting of a polycarbonate resin, a polyester resin, and a polyester carbonate resin.

12. The raw material according to claim 9, wherein the thermoplastic resin is a polycarbonate resin.

13. The raw material according to claim 9, which further comprises carbonic acid diester.

14. The raw material according to claim 9, wherein the saturated water absorption rate of the thermoplastic resin is 0.39% by weight or less.

15. The raw material according to claim 9, wherein the weight average molecular weight of the thermoplastic resin is 35,000 to 70,000.

16. An optical element which is characterized in that it uses a thermoplastic resin obtained from the compound according to claim 1.

17. An optical lens which is characterized in that it uses a thermoplastic resin obtained from the compound according to claim 1.

18. An optical film which is characterized in that it uses a thermoplastic resin obtained from the compound according to claim 1.

19. An optical element which is characterized in that it uses a thermoplastic resin obtained from the raw material according to claim 9.

20. An optical lens which is characterized in that it uses a thermoplastic resin obtained from the raw material according to claim 9.

21. An optical film which is characterized in that it uses a thermoplastic resin obtained from the raw material according to claim 9.

* * * * *